United States Patent
Raksha et al.

(10) Patent No.: US 9,508,475 B2
(45) Date of Patent: Nov. 29, 2016

(54) MAGNETIC MULTILAYER PIGMENT FLAKE AND COATING COMPOSITION

(71) Applicant: Viavi Solutions Inc., Milpitas, CA (US)

(72) Inventors: Vladimir P. Raksha, Santa Rosa, CA (US); Paul T. Kohlmann, Windsor, CA (US); Cornelis Jan Delst, Fairfax, CA (US); Paul G. Coombs, Santa Rosa, CA (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 108 days.

(21) Appl. No.: 13/733,792

(22) Filed: Jan. 3, 2013

(65) Prior Publication Data

US 2013/0119298 A1 May 16, 2013

Related U.S. Application Data

(63) Continuation-in-part of application No. 12/828,069, filed on Jun. 30, 2010, now abandoned.

(51) Int. Cl.

| | |
|---|---|
| *H01F 1/01* | (2006.01) |
| *C09D 7/12* | (2006.01) |
| *C09C 1/00* | (2006.01) |
| *H01F 1/28* | (2006.01) |
| *C09D 5/32* | (2006.01) |
| *C09D 11/037* | (2014.01) |
| *H01F 1/26* | (2006.01) |

(52) U.S. Cl.
CPC ............... *H01F 1/01* (2013.01); *C09C 1/0015* (2013.01); *C09D 5/32* (2013.01); *C09D 7/1225* (2013.01); *C09D 7/1291* (2013.01); *C09D 11/037* (2013.01); *H01F 1/28* (2013.01); *C01P 2004/54* (2013.01); *C01P 2004/61* (2013.01); *C01P 2006/42* (2013.01); *C09C 2200/1054* (2013.01); *C09C 2210/00* (2013.01); *H01F 1/26* (2013.01)

(58) Field of Classification Search
None
See application file for complete search history.

(56) References Cited

U.S. PATENT DOCUMENTS

| | | | |
|---|---|---|---|
| 3,027,252 A | 3/1962 | McGurty et al. | ............... 420/40 |
| 3,052,576 A | 9/1962 | Josso | ............... 148/120 |
| 3,858,977 A | 1/1975 | Baird et al. | ............... 356/71 |
| 3,951,679 A | 4/1976 | Bernhard et al. | ............. 106/418 |
| 4,146,403 A | 3/1979 | Armanini et al. | ............. 106/418 |

(Continued)

FOREIGN PATENT DOCUMENTS

| | | | |
|---|---|---|---|
| EP | 1918331 | 5/2008 | ............... C09C 1/00 |
| WO | 93/13896 | 7/1993 | ............... B22F 1/02 |
| WO | 00/34395 | 6/2000 | ............... C09C 1/00 |

OTHER PUBLICATIONS

EP Search Report for EP appln No. 11169456.8, Sep. 29, 2011.

(Continued)

*Primary Examiner* — Alexandre Ferre
(74) *Attorney, Agent, or Firm* — Mannava & Kang, P.C.

(57) ABSTRACT

The present invention provides a magnetic multilayer pigment flake and a magnetic coating composition that are relatively safe for human health and the environment. The pigment flake includes one or more magnetic layers of a magnetic alloy and one or more dielectric layers of a dielectric material. The magnetic alloy is an iron-chromium alloy or an iron-chromium-aluminum alloy, having a substantially nickel-free composition. The coating composition includes a plurality of the pigment flakes disposed in a binder medium.

18 Claims, 4 Drawing Sheets

(56) References Cited

U.S. PATENT DOCUMENTS

| | | | |
|---|---|---|---|
| 4,838,648 A * | 6/1989 | Phillips et al. | 359/585 |
| 4,978,394 A | 12/1990 | Ostertag et al. | 106/404 |
| 5,059,245 A | 10/1991 | Phillips et al. | 106/31.65 |
| 5,364,467 A | 11/1994 | Schmid et al. | 106/404 |
| 5,424,119 A | 6/1995 | Phillips et al. | 428/328 |
| 5,571,624 A | 11/1996 | Phillips et al. | 428/403 |
| 5,925,455 A | 7/1999 | Bruzzone et al. | 428/328 |
| 6,132,504 A | 10/2000 | Kuntz et al. | 106/404 |
| 6,150,022 A * | 11/2000 | Coulter | C09C 1/0015 106/499 |
| 6,156,115 A | 12/2000 | Pfaff et al. | 106/403 |
| 6,235,105 B1 | 5/2001 | Hubbard et al. | 106/415 |
| 6,310,837 B1 | 10/2001 | Chou et al. | 369/13 |
| 6,524,381 B1 | 2/2003 | Phillips et al. | 106/417 |
| 6,648,957 B1 | 11/2003 | Andes et al. | 106/415 |
| 6,759,097 B2 | 7/2004 | Phillips et al. | 427/510 |
| 6,808,806 B2 | 10/2004 | Phillips et al. | 428/403 |
| 6,818,299 B2 | 11/2004 | Phillips et al. | 428/403 |
| 7,047,883 B2 | 5/2006 | Raksha et al. | 101/489 |
| 7,169,472 B2 | 1/2007 | Raksha et al. | 428/403 |
| 2002/0182383 A1 | 12/2002 | Phillips et al. | 428/199 |
| 2006/0081151 A1 | 4/2006 | Raksha et al. | 106/31.92 |
| 2007/0268349 A1 | 11/2007 | Kurman | 347/102 |

OTHER PUBLICATIONS

Hultquist et al. "Selective Oxidation of FeCr Alloys in the 295-450K Temperature Range", Oxidation of Metals, vol. 25, No. 5-6, 1986.

Sadique et al. "High-Temperature Oxidation Behaviour of Iron—Chromium—aluminum alloys" Oxidation of Metals, vol. 54, Nos. 5/6, 2002.

* cited by examiner

MAGNETIC MULTILAYER PIGMENT FLAKE AND COATING COMPOSITION

CROSS-REFERENCE TO RELATED APPLICATIONS

This application is a continuation-in-part of U.S. patent application Ser. No. 12/828,069 to Raksha et al. filed on Jun. 30, 2010, which is incorporated herein by reference.

TECHNICAL FIELD OF THE INVENTION

The present invention relates to multilayer pigment flakes and to coating compositions incorporating such pigment flakes. In particular, the present invention relates to magnetic multilayer pigment flakes and to magnetic coating compositions.

BACKGROUND OF THE INVENTION

Chromium-containing materials are widely used in coating compositions because of their advantageous optical-absorption and corrosion-inhibiting properties. In many coating compositions, such as interference coating compositions, layers of chromium-containing materials are used as absorbing layers in multilayer pigment flakes.

For example, as disclosed in U.S. Pat. No. 3,858,977 to Baird, et al., issued on Jan. 7, 1975, in U.S. Pat. No. 5,059,245 to Phillips, et al., issued on Oct. 22, 1991, in U.S. Pat. No. 5,571,624 to Phillips, et al., issued on Nov. 5, 1996, in U.S. Pat. No. 6,132,504 to Kuntz, et al., issued on Oct. 17, 2000, and in U.S. Pat. No. 6,156,115 to Pfaff, et al., issued on Dec. 5, 2000, which are incorporated herein by reference, layers of chromium metal may be used as absorbing layers. As disclosed in U.S. Pat. No. 4,978,394 to Ostertag, et al., issued on Dec. 18, 1990, and in U.S. Pat. No. 5,364,467 to Schmid, et al., issued on Nov. 15, 1994, which are incorporated herein by reference, layers of chromium(III) oxide ($Cr_2O_3$) may be used as absorbing layers. As disclosed in U.S. Pat. No. 5,424,119 to Phillips, et al., issued on Jun. 13, 1995, in U.S. Pat. No. 6,235,105 to Hubbard, et al., issued on May 22, 2001, in U.S. Pat. No. 6,524,381 to Phillips, et al., issued on Feb. 25, 2003, in U.S. Pat. No. 6,648,957 to Andes, et al., issued on Nov. 18, 2003, in U.S. Pat. No. 6,759,097 to Phillips, et al., issued on Jul. 6, 2004, in U.S. Pat. No. 6,818,299 to Phillips, et al., issued on Nov. 16, 2004, and in U.S. Pat. No. 7,169,472 to Raksha, et al., issued on Jan. 30, 2007, which are incorporated herein by reference, layers of commonly available chromium-containing alloys, such as Hastelloys, Inconels, stainless steels, and nickel-chromium alloys, may be used as absorbing layers.

Unfortunately, many of the chromium-containing materials in the absorbing layers of prior-art coating compositions are harmful to human health. Chromium metal and chromium(III) oxide, for example, each cause irritation to the skin, eyes, respiratory tract, and gastrointestinal tract. Moreover, these materials may be oxidized to form chromium(VI) species, which are, generally, toxic and carcinogenic. Furthermore, the chromium-containing alloys used in the absorbing layers of prior-art coating compositions, typically, also contain nickel, which is toxic and carcinogenic. Therefore, many prior-art coating compositions based on chromium-containing materials pose potential health and environmental hazards.

Despite their advantageous corrosion-inhibiting properties, in particular, chromium-containing magnetic alloys are not, generally, used as magnetic layers in multilayer magnetic pigment flakes. Rather, as disclosed in U.S. Pat. No. 6,808,806 to Phillips, et al., issued on Oct. 26, 2004, in U.S. Pat. No. 6,818,299, and in U.S. Pat. No. 7,169,472, additional dielectric or insulator layers are, conventionally, used to improve the corrosion resistance of magnetic layers.

SUMMARY OF THE INVENTION

An object of the present invention is to overcome the shortcomings of the prior art by providing a magnetic multilayer pigment flake and a magnetic coating composition that are relatively safe for human health and the environment.

Accordingly, the present invention relates to a magnetic multilayer pigment flake comprising: one or more magnetic layers of a magnetic alloy, wherein the magnetic alloy is an iron-chromium alloy or an iron-chromium-aluminum alloy, having a substantially nickel-free composition; and one or more dielectric layers.

Another aspect of the present invention relates to a magnetic coating composition comprising: a binder medium; and a plurality of magnetic multilayer pigment flakes disposed in the binder medium, wherein the plurality of pigment flakes each comprise: one or more magnetic layers of a magnetic alloy, wherein the magnetic alloy is an iron-chromium alloy or an iron-chromium-aluminum alloy, having a substantially nickel-free composition; and one or more dielectric layers.

BRIEF DESCRIPTION OF THE DRAWINGS

The present invention will be described in greater detail with reference to the accompanying drawings, which represent exemplary embodiments thereof, wherein.

DETAILED DESCRIPTION OF THE INVENTION

Figure 1A:
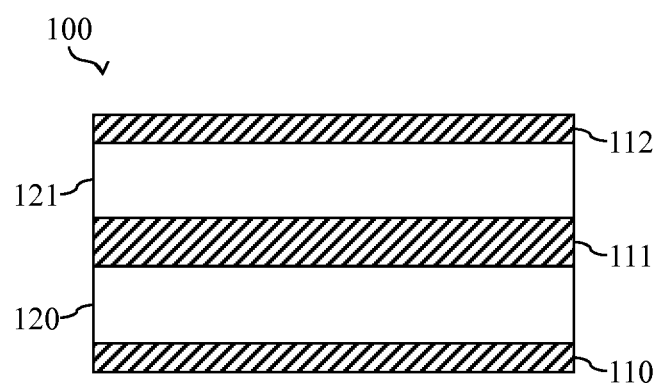
FIG. 1A is a schematic illustration of a cross-section of a first preferred embodiment of a magnetic multilayer pigment flake.

The present invention provides a magnetic multilayer pigment flake and a magnetic coating composition incorporating such pigment flakes. The pigment flake and, consequently, the coating composition substantially preclude the release of potentially harmful nickel and chromium(VI), while providing advantageous magnetic, optical, and corrosion-inhibiting properties.

The pigment flake includes a plurality of thin-film layers of various materials. Generally, the pigment flake has an aspect ratio of at least 2:1 and an average particle size of about 2 µm to about 20 µm.

In particular, the pigment flake includes one or more magnetic layers of a magnetic alloy, i.e. a ferro- or ferrimagnetic alloy, enabling the pigment flake to be aligned with a magnetic field. The magnetic alloy has a nickel-free composition including iron and chromium. Optionally, the composition of the magnetic alloy may also include other metals, such as aluminum, minor constituents, and/or impurities, e.g. carbon and/or silicon on the scale of about 0.1 wt %. Preferably, the composition of the magnetic alloy consists essentially of iron and chromium or of iron, chromium, and aluminum. For example, the magnetic alloy may be an iron-chromium alloy or an iron-chromium-aluminum alloy.

In the magnetic alloy, the chromium atoms are bonded by metallic bonds, which involve the sharing of electrons. Thus, chromium is present in the magnetic alloy as chromium(0). If the magnetic alloy is subject to corrosion, chromium is mainly released as chromium(III), rather than potentially harmful chromium(VI). Moreover, a chromium(III)-containing oxide may be formed, which passivates the surface of the magnetic alloy, inhibiting further corrosion.

The inventors have found that a composition of the magnetic alloy including about 5 wt % to about 30 wt % chromium, about 0 wt % to about 18 wt % aluminum, and a balance of iron minimizes the undesirable release of chromium(VI), but retains desirable magnetic, optical, and corrosion-inhibiting properties. Preferably, the pigment flake releases substantially no chromium(VI). Moreover, the inclusion of aluminum in the magnetic alloy provides increased reflectance.

Preferably, the composition of the magnetic alloy consists essentially of about 5 wt % to about 30 wt % chromium, about 0 wt % to about 18 wt % aluminum, and a balance of iron. That is, the magnetic alloy may be an iron-chromium alloy having a composition consisting essentially of about 5 wt % to about 30 wt % chromium, and a balance of iron, or may be an iron-chromium-aluminum alloy having a composition consisting essentially of about 5 wt % to about 30 wt % chromium, greater than 0 wt % to about 18 wt % aluminum, and a balance of iron.

In a preferred embodiment, which provides advantageous optical-absorption properties, the magnetic alloy is an iron-chromium alloy having a composition consisting essentially of about 5 wt % to about 15 wt % chromium and a balance of iron. In some instances, the magnetic iron-chromium alloy has a composition consisting essentially of about 10 wt % to about 12 wt % chromium and a balance of iron.

In another preferred embodiment, which provides advantageous optical-reflection properties, the magnetic alloy is an iron-chromium-aluminum alloy having a composition consisting essentially of about 10 wt % to about 30 wt % chromium, about 1 wt % to about 18 wt % aluminum, and a balance of iron. In some instances, the magnetic iron-chromium-aluminum alloy has a composition consisting essentially of about 18 wt % to about 25 wt % chromium, about 6 wt % to about 15 wt % aluminum, and a balance of iron.

It should be noted that the composition of the magnetic alloy may differ, sometimes considerably, in different pigment flakes within the same batch of pigment flakes due to local variations in the deposited composition.

The pigment flake, typically, includes a plurality of magnetic layers of the magnetic alloy, in addition to a plurality of dielectric layers. Optionally, the pigment flake may also include layers of other types.

The magnetic layers of the magnetic alloy, typically, serve as absorbing layers for absorbing light and/or as reflecting layers for reflecting light. In other words, the pigment flake may include one or more absorbing magnetic layers and/or one or more reflecting magnetic layers. The magnetic layers may be formed of the same or different magnetic alloys and may have the same or different physical thicknesses. For example, the pigment flake may include one or more absorbing magnetic layers and one or more reflecting magnetic layers formed of the same magnetic alloy, but having different physical thicknesses. Generally, the magnetic layers each have a physical thickness of about 3 nm to about 1000 nm. In instances where the magnetic layers serve as absorbing layers, the magnetic layers are semi-transparent, each, typically, having a physical thickness of about 3 nm to about 50 nm. Preferably, such semi-transparent absorbing magnetic layers each have a physical thickness of about 5 nm to about 15 nm. In instances where the magnetic layers serve as reflecting layers, the magnetic layers are opaque, each, typically, having a physical thickness of about 20 nm to about 1000 nm. Preferably, such opaque reflecting magnetic layers each have a physical thickness of about 50 nm to about 100 nm. Generally, the magnetic layers are amorphous, having been deposited by evaporation in vacuum.

In some instances, an opaque layer of a reflective material other than the magnetic alloy may serve as a reflecting layer for reflecting light. Suitable reflective materials include tin, aluminum, copper, silver, gold, palladium, platinum, titanium, and compounds or alloys thereof. Such an opaque reflecting layer is, preferably, formed of aluminum. Typically, such an opaque reflecting layer has a physical thickness within the same ranges as the opaque reflecting magnetic layers.

The dielectric layers, typically, serve as transparent spacer layers, and provide the pigment flake with durability and rigidity. The dielectric layers may be formed of any transparent dielectric material having a low refractive index, i.e. a refractive index of less than about 1.65, or a high refractive index, i.e. a refractive index of greater than about 1.65. Suitable dielectric materials having a low refractive index include silicon dioxide ($SiO_2$), aluminum oxide ($Al_2O_3$), and metal fluorides, such as magnesium fluoride ($MgF_2$). Suitable dielectric materials having a high refractive index include silicon monoxide (SiO) and zinc sulfide (ZnS). Preferably, the dielectric layers are formed of magnesium fluoride.

The dielectric layers may be formed of the same or different dielectric materials and may have the same or different physical thicknesses. For example, the pigment flake may include one or more dielectric layers formed of the same dielectric material, but having different physical thicknesses and, therefore, different optical thicknesses. Generally, the dielectric layers each have a physical thickness of about 100 nm to about 5000 nm. The physical thickness is selected to correspond with an optical thickness required by a layer structure of the pigment flake for providing a desired optical effect.

The pigment flake may have a variety of layer structures, having various compositional and layer-thickness profiles, for providing a variety of optical effects. Typically, the pigment flake has an interference layer structure. Preferably, the pigment flakes has an interference layer structure for providing a color-shifting effect through the interference of light, such that the pigment flake changes color with viewing angle or angle of incident light.

With reference to FIG. 1A, a first preferred embodiment of the pigment flake 100 has a symmetrical interference layer structure including five layers: two semi-transparent absorbing magnetic layers 110 and 112, two transparent dielectric layers 120 and 121, and one opaque reflecting layer 111, which may be non-magnetic or magnetic. A first transparent dielectric layer 120 overlies a first semi-transparent absorbing magnetic layer 110, a central opaque reflecting layer 111 overlies the first transparent dielectric layer 120, a second transparent dielectric layer 121 overlies the central opaque reflecting layer 111, and a second semi-transparent absorbing magnetic layer 112 overlies the second transparent dielectric layer 121.

The first and second semi-transparent absorbing magnetic layers 110 and 112 are formed of the magnetic alloy, and the first and second transparent dielectric layers 120 and 121 are formed of a dielectric material, as described heretofore.

In some embodiments, the central opaque reflecting layer 111 is formed of a reflective material other than the magnetic alloy, as described heretofore. To illustrate such an embodiment, a layer stack was fabricated having the following layer structure: Fe—Cr, semi-transparent/$MgF_2$, 370 nm/Al, opaque/$MgF_2$, 370 nm/Fe—Cr, semi-transparent. First and second semi-transparent absorbing magnetic layers 110 and 112 of an iron-chromium alloy, first and second transparent dielectric layers 120 and 121 of magnesium fluoride, and a central opaque reflecting layer 111 of aluminum were deposited by evaporation in vacuum onto a polyester substrate. The iron-chromium alloy had a composition consisting essentially of about 10 wt % to about 12 wt % chromium and a balance of iron.

Figure 1B:
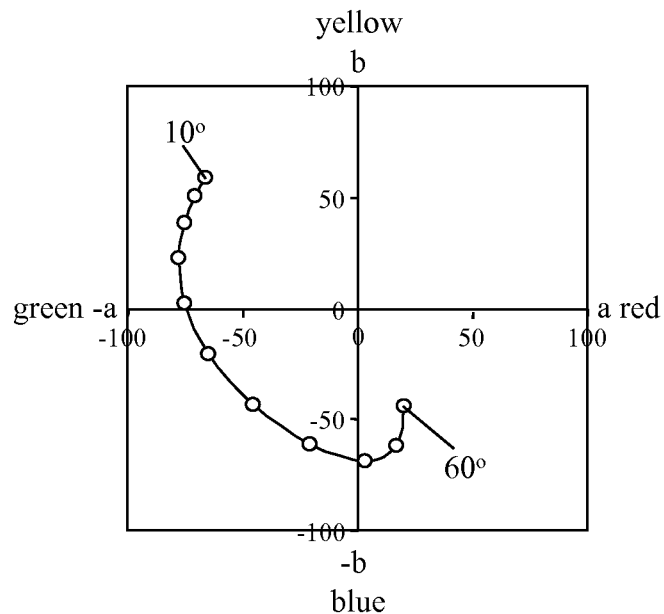
FIG. 1B is a plot of the angle-dependent color travel of a magnetic coating composition comprising a plurality of the pigment flakes of FIG. 1A having the following layer structure: Fe—Cr, semi-transparent/$MgF_2$, 370 nm/Al, opaque/$MgF_2$, 370 nm/Fe—Cr, semi-transparent.

The layer stack was stripped from the substrate and ground to form a plurality of pigment flakes 100 having an average particle size of about 20 μm. The plurality of pigment flakes 100 were combined with a binder medium to form a coating composition, and the coating composition was printed onto a paper substrate and dried. The color-shifting properties of the printed coating composition were then analyzed with a goniospectrophotometer. The angle-dependent color travel of the printed coating composition with a change of viewing angle from 10° to 60° is plotted in FIG. 1B.

In other embodiments, the central opaque reflecting layer 111 is formed of the magnetic alloy, preferably, embodied as an iron-chromium-aluminum alloy, such that the magnetic layers 110, 111, and 112 alternate with the dielectric layers 120 and 121. To illustrate such an embodiment, a layer stack was fabricated having the following layer structure: Fe—Cr—Al, semi-transparent/$MgF_2$, 370 nm/Fe—Cr—Al, opaque/$MgF_2$, 370 nm/Fe—Cr—Al, semi-transparent. First and second semi-transparent absorbing magnetic layers 110 and 112 of an iron-chromium-aluminum alloy, first and second transparent dielectric layers 120 and 121 of magnesium fluoride, and a central opaque reflecting magnetic layer 111 of the iron-chromium-aluminum alloy were deposited by evaporation in vacuum onto a polyester substrate to form the layer stack. The iron-chromium-aluminum alloy had a composition consisting essentially of about 18 wt % to about 25 wt % chromium, about 6 wt % to about 15 wt % aluminum, and a balance of iron.

Figure 1C:
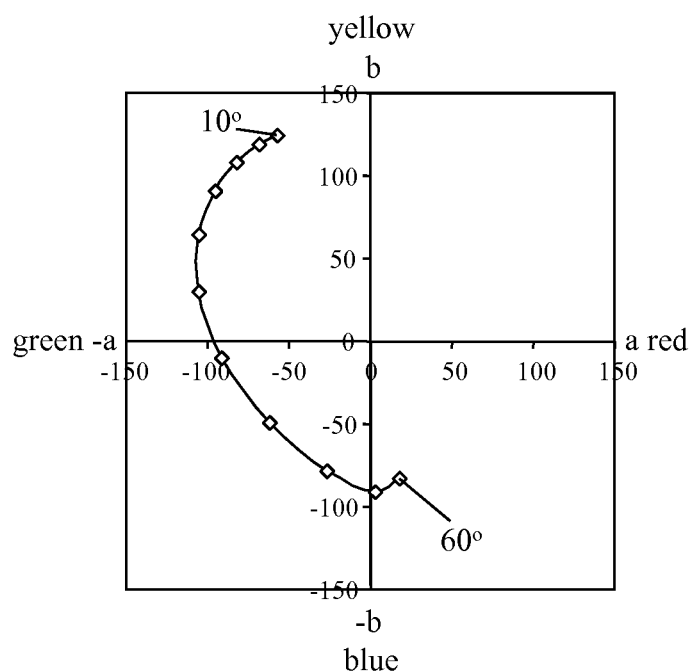
FIG. 1C is a plot of the angle-dependent color travel of a magnetic coating composition comprising a plurality of the pigment flakes of FIG. 1A having the following layer structure: Fe—Cr—Al, semi-transparent/$MgF_2$, 370 nm/Fe—Cr—Al, opaque/$MgF_2$, 370 nm/Fe—Cr—Al, semi-transparent.

The layer stack was stripped from the substrate and ground to form a plurality of pigment flakes 100 having an average particle size of about 20 μm. The plurality of pigment flakes 100 were combined with a binder medium to form a coating composition, and the coating composition was printed onto a paper substrate and dried. The color-shifting properties of the printed coating composition were then analyzed with a goniospectrophotometer. The angle-dependent color travel of the printed coating composition with a change of viewing angle from 10° to 60° is plotted in FIG. 1C.

Advantageously, embodiments of the pigment flake that include a plurality of magnetic layers of the magnetic alloy in alternation with a plurality of dielectric layers absorb microwave radiation particularly well, allowing the pigment flake to be heated with microwave radiation. In such embodiments, the magnetic alloy serves three different functions: enabling microwave absorption by the pigment flake, enabling optical absorption by the pigment flake, and enabling magnetic alignment of the pigment flake.

In some embodiments, the pigment flake includes inner and outer groups of dielectric layers having different optical thicknesses and different functionalities. Typically, the dielectric layers of the inner group have one or more optical thicknesses selected to provide resonant microwave absorption, whereas the dielectric layers of the outer group have one or more optical thicknesses, different from those of the inner group, selected to provide an interference color.

Figure 2A:
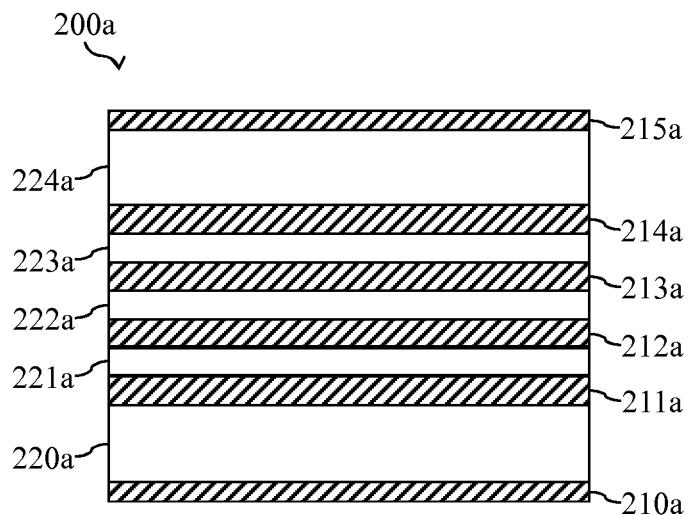
FIG. 2A is a schematic illustration of a cross-section of a second preferred embodiment of a magnetic multilayer pigment flake having a first layer-thickness profile.
Figure 2B:
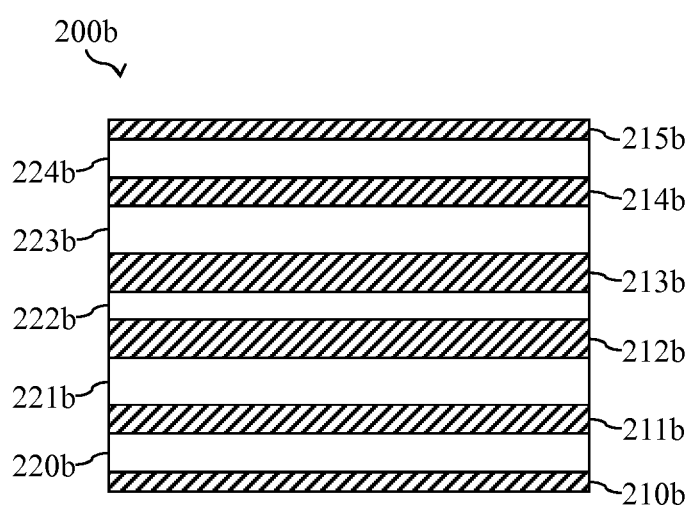
FIG. 2B is a schematic illustration of a cross-section of a second preferred embodiment of a magnetic multilayer pigment flake having a second layer-thickness profile.

With reference to FIGS. 2A and 2B, a second preferred embodiment of the pigment flake 200a/200b has a symmetrical interference structure including eleven layers: two semi-transparent absorbing magnetic layers 210a/210b and 215a/215b, five transparent dielectric layers 220a/220b, 221a/221b. 222a/222b. 223a/223b, and 224a/224b, and four opaque reflecting magnetic layers 211a/211b, 212a/212b, 213a/213b, and 214a/214b. In the illustrated embodiment, the magnetic layers 210a/210b, 211a/211b. 212a/212b. 213a/213b, 214a/214b, and 215a/215b are all formed of the same magnetic alloy. Likewise, the dielectric layers 220a/220b, 221a/221b. 222a/222b. 223a/223b, and 224a/224b are all formed of the same dielectric material.

A first transparent dielectric layer 220a/220b overlies a first semi-transparent magnetic layer 210a/210b, a first opaque reflecting magnetic layer 211a/211b overlies the first transparent dielectric layer 220a/220b, a second transparent dielectric layer 221a/221b overlies the first opaque reflecting magnetic layer 211a/211b, a second opaque reflecting magnetic layer 212a/212b overlies the second transparent dielectric layer 221a/221b, a third transparent dielectric layer 222a/222b overlies the second opaque reflecting magnetic layer 212a/212b, a third opaque reflecting magnetic layer 213a/213b overlies the third transparent dielectric layer 222a/222b, a fourth transparent dielectric layer 223a/223b overlies the third opaque reflecting magnetic layer 213a/213b, a fourth opaque reflecting magnetic layer 214a/214b overlies the fourth transparent dielectric layer 223a/223b, a fifth transparent dielectric layer 224a/224b overlies the fourth opaque reflecting magnetic layer 214a/214b, and a second semi-transparent absorbing magnetic layer 215a/215b overlies the fifth transparent dielectric layer 224a/224b, such that the magnetic layers 210a/210b, 211a/211b, 212a/212b, 213a/213b, 214a/214b, and 215a/215b alternate with the dielectric layers 220a/220b, 221a/221b, 222a/222b, 223a/223b, and 224a/224b.

The first and second semi-transparent absorbing magnetic layers 210a/210b and 215a/215b, and the first, second, third, and fourth opaque reflecting magnetic layers 211a/211b, 212a/212b, 213a/213b, and 214a/214b are formed of the magnetic alloy. The first, second, third, fourth, and fifth transparent dielectric layers 220a/220b, 221a/221b, 222a/

222b, 223a/223b, and 224a/224b are formed of a dielectric material, as described heretofore.

The pigment flake 200a/200b may have various layer-thickness profiles selected to optimize resonant microwave absorption over a large bandwidth. With particular reference to FIG. 2A, according to a first layer-thickness profile of the pigment flake 200a, the first, second, third, and fourth opaque reflecting magnetic layers 211a, 212a, 213a, and 214a have the same physical thickness, which is larger than that of the first and second semi-transparent absorbing magnetic layers 210a and 215a. The second, third, and fourth transparent dielectric layers 221a, 222a, and 223a have the same physical thickness, which is smaller than that of the first and fifth transparent dielectric layers 220a and 224a.

With particular reference to FIG. 2B, according to a second layer-thickness profile of the pigment flake 200b, the physical thickness of the second and third opaque reflecting magnetic layers 212b and 213b is larger than that of the first and fourth opaque reflecting magnetic layers 211b and 214b, which is larger than that of the first and second semi-transparent absorbing magnetic layers 210b and 215b. The physical thickness of the third transparent dielectric layer 222b is smaller than that of the first and fifth transparent dielectric layers 220b and 224b, which is smaller than that of the second and fourth transparent dielectric layers 221b and 223b. Advantageously, such a layer-thickness profile provides a particularly large bandwidth of microwave absorption.

Of course, numerous other embodiments of the pigment flake provided by the present invention may be envisaged without departing from the spirit and scope of the invention.

The pigment flake of the present invention can be formed by various fabrication methods, as disclosed in U.S. Pat. No. 5,059,245, in U.S. Pat. No. 5,571,624, in U.S. Pat. No. 6,524,381, and in U.S. Pat. No. 6,818,299, for example. Generally, some or all of the component layers are sequentially deposited on a substrate by using a conventional deposition technique, such as a physical vapor deposition (PVD), chemical vapor deposition (CVD), or electrolytic deposition, to form a layer stack.

For example, the magnetic layers may be deposited by evaporating a wire of a magnetic alloy, e.g. a ferritic stainless steel or Kanthal alloy, in vacuum. It should be noted that the composition of the magnetic alloy in the deposited magnetic layers often differs from that of the wire. Moreover, the composition of the magnetic alloy may differ, sometimes considerably, at different points in the deposited magnetic layer.

The layer stack is subsequently stripped from the substrate and ground to form a plurality of pigment flakes or preflakes. If preflakes are formed, the remaining component layers are then sequentially deposited on the preflakes to form a plurality of pigment flakes.

The plurality of pigment flakes may be combined with a binder medium to produce the coating composition of the present invention. Typically, the binder medium includes a resin that can be cured, for example, by evaporation, by heating, or by exposure to ultraviolet (UV) radiation. Suitable resins include alkyd resins, polyester resins, acrylic resins, polyurethane resins, vinyl resins, epoxy resins, styrene resins, and melamine resins. Optionally, the binder medium may include a solvent, such as an organic solvent or water, a cure retarder, such as clove oil, or other additives.

The coating composition may be used as a paint or an ink and applied to various objects, such as currency and security documents, product packagings, fabrics, motorized vehicles, sporting goods, electronic housings, household appliances, architectural structures, and floorings. Preferably, the coating composition is an interference coating composition providing a color-shifting effect through the interference of light.

Being relatively safe for human health and the environment, the coating composition is well-suited for use in applications where chemical safety is a concern and for use under conditions where chemical release is likely to occur.

Being magnetic, the coating composition is also well-suited for use in printing optical-effect images, such as three-dimensional, illusionary, and/or kinematic images, by aligning the magnetic pigment flakes within the coating composition with a magnetic field. A variety of optical-effect images for decorative and security applications can be produced by various methods, as disclosed in U.S. Pat. No. 6,759,097, in U.S. Pat. No. 7,047,883 to Raksha, et al., issued on May 23, 2006, in U.S. Patent Application Publication No. 2006/0081151 to Raksha, et al., published on Apr. 20, 2006, and in U.S. Patent Application Publication No. 2007/0268349 to Kurman, published on Nov. 22, 2007, for example, which are incorporated herein by reference.

Generally, the coating composition is printed on a substrate by a conventional printing technique, such as gravure, stamping, intaglio, flexographic, silk-screen, jet, or lithographic printing. While still fluid or after being re-fluidized, the coating composition is exposed to a magnetic field, which aligns the magnetic pigment flakes within the coating in a desired pattern. The binder medium within the coating composition is then cured, for example, by evaporation, by heating, or by exposure to UV radiation, fixing the alignment of the pigment flakes in the desired pattern to form the optical-effect image.

Figure 3A:
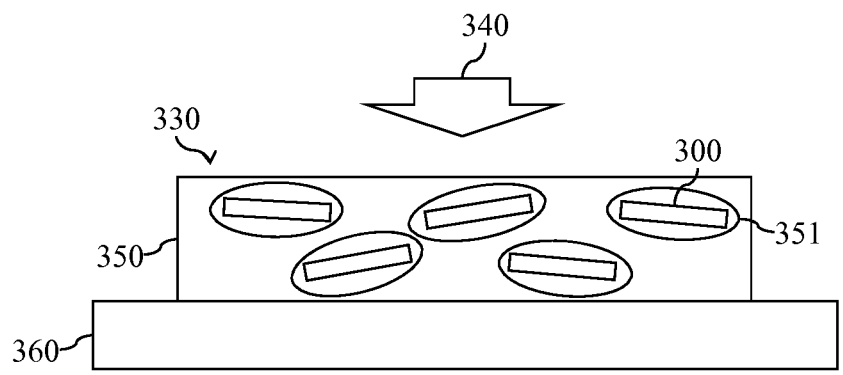
FIG. 3A is a schematic illustration of a preferred embodiment of a coating composition being exposed to microwave radiation.
Figure 3B:
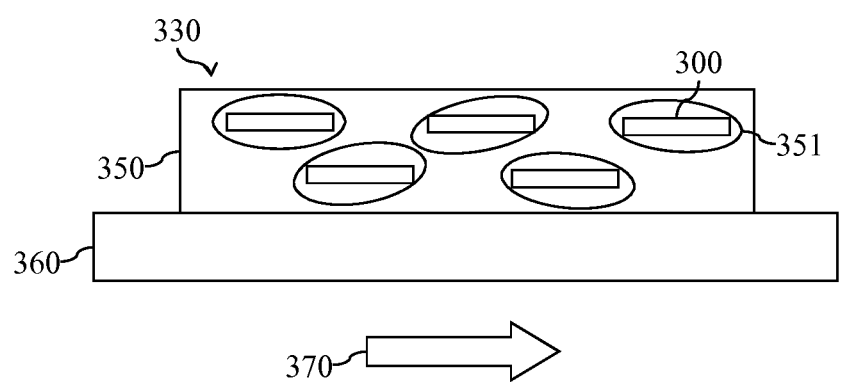
FIG. 3B is a schematic illustration of the coating composition illustrated in FIG. 3A being exposed to a magnetic field.

With reference to FIGS. 3A and 3B, a preferred embodiment of the coating composition 330, which is well-suited for use as an intaglio ink, includes pigment flakes 300 that absorb microwave radiation 340 disposed in a high-viscosity binder medium 350. The coating composition 330 is printed on a substrate 360. With particular reference to FIG. 3A, when the coating composition 330 is exposed to microwave radiation 340, the pigment flakes 300 absorb the microwave radiation 340, generating heat. The generated heat reduces the viscosity of the binder medium 350 in microcapsules 351 surrounding the pigment flakes 300. Advantageously, it is only necessary to apply enough microwave radiation 340 to the coating composition 330 to reduce the viscosity within the microcapsules 351, rather than within the binder medium 350 as a whole.

With particular reference to FIG. 3B, when the coating composition 330 is soon afterward exposed to a magnetic field 370, the pigment flakes 300, which are free to move within the low-viscosity microcapsules 351, align themselves with the magnetic field 370. The coating composition 330 is then removed from the magnetic field 370 and is cured by evaporation, fixing the alignment of the pigment flakes 300. Although the pigment flakes 300 are illustrated in FIG. 3B as being aligned parallel to the substrate 360, the pigment flakes 300 may be aligned in numerous other patterns by varying the direction and intensity of the magnetic field 370.

Of course, numerous other embodiments of the coating composition provided by the present invention may be envisaged without departing from the spirit and scope of the invention.

We claim:

1. A multilayer pigment flake comprising:
   one or more layers of a ferromagnetic or ferrimagnetic alloy;
   one or more dielectric layers; and
   a central opaque reflecting layer of aluminum;
   wherein the one or more layers of ferromagnetic or ferrimagnetic alloy include first and second semi-transparent layers;
   wherein the ferromagnetic or ferrimagnetic alloy is an iron-chromium alloy or an iron-chromium-aluminum alloy having a substantially nickel-free composition;
   wherein the one or more dielectric layers include first and second transparent dielectric layers;
   wherein the first transparent dielectric layer overlies the first semi-transparent magnetic layer;
   wherein the central opaque reflecting layer overlies the first transparent dielectric layer;
   wherein the second transparent dielectric layer overlies the central opaque reflecting layer; and
   wherein the second semi-transparent absorbing magnetic layer overlies the second transparent dielectric layer.

2. The pigment flake of claim 1, wherein the composition of the ferromagnetic or ferrimagnetic alloy consists essentially of about 5 wt % to about 30 wt % chromium, about 0 wt % to about 18 wt % aluminum, and a balance of iron.

3. The pigment flake of claim 1, wherein the ferromagnetic or ferrimagnetic alloy is an iron-chromium alloy, and wherein the composition of the ferromagnetic or ferrimagnetic alloy consists essentially of about 5 wt % to about 15 wt % chromium, and a balance of iron.

4. The pigment flake of claim 1, wherein the magnetic alloy is an iron-chromium-aluminum alloy, and wherein the composition of the ferromagnetic or ferrimagnetic alloy consists essentially of about 10 wt % to about 30 wt % chromium, about 1 wt % to about 18 wt % aluminum, and a balance of iron.

5. The pigment flake of claim 1, wherein the one or more layers of ferromagnetic or ferrimagnetic alloy are amorphous thin-film layers.

6. The pigment flake of claim 1, wherein the pigment flake has an interference layer structure, such that the pigment flake changes color with viewing angle or angle of incident light.

7. The pigment flake of claim 1, wherein the pigment flake has a layer-thickness profile selected to optimize resonant microwave absorption, such that the pigment flake absorbs microwave radiation and can be heated with microwave radiation.

8. The pigment flake of claim 1 having a particle size of about 2 μm to about 20 μm.

9. The pigment flake of claim 1, wherein the ferromagnetic or ferrimagnetic alloy is an iron-chromium-aluminum alloy, and wherein the composition of the magnetic alloy consists essentially of about 18 wt % to about 25 wt % chromium, about 6 wt % to about 15 wt % aluminum, and a balance of iron.

10. The pigment flake of claim 1, wherein the dielectric layer is selected from: $SiO_2$, $Al_2O_3$, $MgF_2$, SiO, and ZnS.

11. The pigment flake of claim 1, wherein the dielectric layers have a thickness from 100-5,000 nm.

12. The pigment flake of claim 1, wherein the layers of ferromagnetic or ferrimagnetic alloy have thickness about 20 nm to about 1,000 nm.

13. The pigment flake of claim 1, disposed on a substrate.

14. A magnetic coating composition, comprising:
    a binder medium; and
    a plurality of multilayer pigment flakes according to claim 1, disposed in the binder medium.

15. The coating composition of claim 14, wherein the plurality of pigment flakes each have an interference layer structure, such that the plurality of pigment flakes change color with viewing angle or angle of incident light.

16. The coating composition of claim 14, wherein the plurality of pigment flakes each have a layer-thickness profile selected to optimize resonant microwave absorption, such that the plurality of pigment flakes absorb microwave radiation and can be heated with microwave radiation.

17. The coating composition of claim 14, wherein the binder medium is a high-viscosity binder medium, and wherein the coating composition is an intaglio ink.

18. The coating composition of claim 14, wherein the binder medium includes a curable resin.

* * * * *